Nov. 26, 1968   W. WAITE   3,412,518
INSULATED WALL PANEL WITH SHIP LAP JOINT
Filed Oct. 18, 1967

INVENTOR
WILLIAM WAITE
BY Edward C. Threedy
HIS ATTORNEY.

United States Patent Office 3,412,518
Patented Nov. 26, 1968

3,412,518
INSULATED WALL PANEL WITH SHIPLAP JOINT
William Waite, Elmhurst, Ill., assignor to Transco Inc., Chicago, Ill., a corporation of Delaware
Filed Oct. 18, 1967, Ser. No. 676,214
4 Claims. (Cl. 52—592)

ABSTRACT OF THE DISCLOSURE

An insulated panel capable of being assembled into a wall structure for ducts, tanks, ovens, furnaces and the like comprising a plurality of separated metallic supporting members having disposed therebetween a plurality of metallic foil sheets either randomly wrinkled or preformed so as to provide a cellular structure providing heat retaining baffles, and with the supporting members being so arranged that they can be assembled in a shiplap relation.

Summary of the invention

A plurality of spaced metallic supporting members fixedly connected together in a manner that each of the members is offset with respect to the other through a vertical and horizontal plane, with a grouping of heat-resistant metallic foil sheets disposed therebetween, and with certain of the supporting members along certain edge portions thereof providing lateral flange members which separate the heat retaining sheets of juxtaposed panels, thus acting as heat retaining baffles therebetween.

The invention consists in the novel combination and arrangement of parts to be hereinafter described and claimed. The invention will be best understood by reference to the accompanying drawing showing the preferred form of construction and in which:

My invention relates to an insulated wall panel which when arranged with corresponding panels forms a covering for heating ducts, tanks, ovens, nuclear plants and the like. Each panel may be prefabricated to existing forms and designs and readily assembled.

Figure 4:
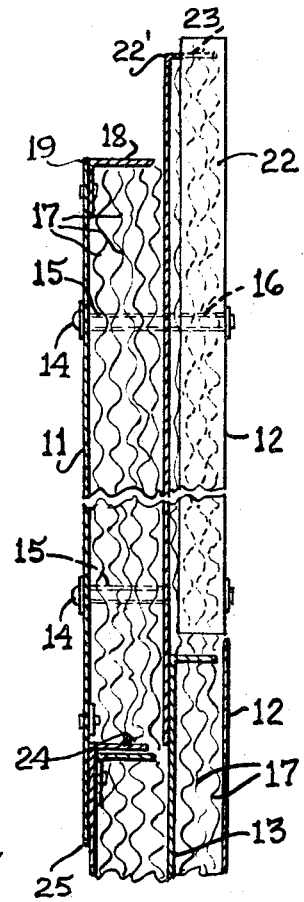
FIG. 4 is a sectional view taken on line 4—4 of FIG. 2 showing in detail the assembled relation of the insulated wall panels.
Figure 3:
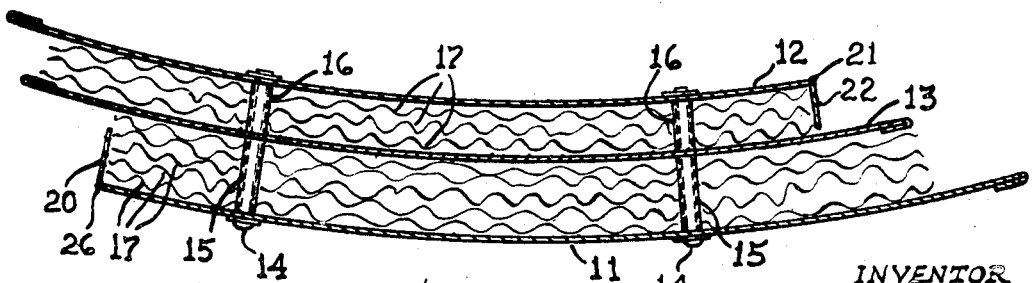
FIG. 3 is a detailed sectional view taken on line 3—3 of FIG. 1.

The improved wall panel 10 comprises an outer metallic wall 11, an inner retaining wall 12, and a center separating and supporting plate 13. The composite units of each wall panel 10 are integrally connected together by a plurality of rivets 14 which extend through spacer bushings 15, utilized to separate the outer wall 11 from the center separating and supporting plate 13, as well as spacer bushings 16 utilized to separate the center separating and supporting plate 13 from the inner wall 12, all of which is illustrated in FIGS. 3 and 4 of the drawing. Between the outer wall 11, the center plate 13 and the inner wall 12, and impinged on the bushings 15 and 16, are a plurality of metallic sheets 17. These sheets 17 may be formed from randomly wrinkled aluminum as shown in FIGS. 3 and 4, or may comprise sheets of metallic material preformed to provide a cellular inner structure between the outer wall 11, inner wall 12, and center separating and supporting plate 13.

Figure 1:
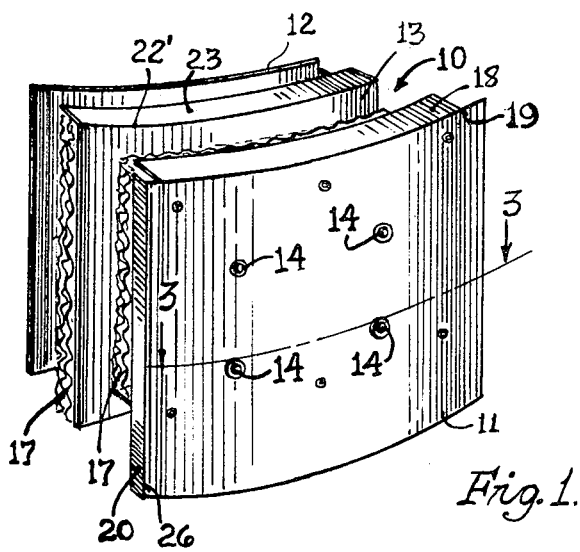
FIG. 1 is a perspective view of the improved insulated wall panel.
Figure 2:
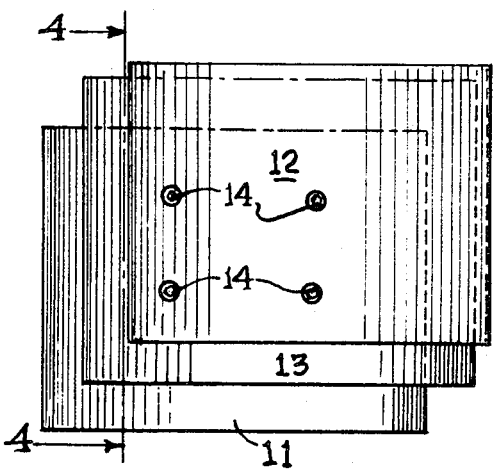
FIG. 2 is a rear elevational view of the insulated wall panel.

As viewed in FIG. 1, the outer wall 11 provides an inwardly directed lateral form-retaining flange 18 extending from the upper lateral edge 19 of the wall 11 as well as a side edge laterally extending flange 20. The flanges 18 and 20 form heat-retaining baffles which function to intercept the disbursement of heat retained by the aluminum sheets 17 and caused thereby to move vertically and laterally between the randomly wrinkled surfaces thereof.

The inner wall 12 provides along one lateral edge 21 an inwardly directed flange 22 forming a heat-retaining baffle between it and the center separating and supporting plate 13.

The center separating and supporting plate 13 provides along its uppermost horizontal edge 22' a laterally extending heat retaining baffle 23 extending in the direction of the inner wall 12 as seen in FIGS. 1 and 4.

The outer wall 11 provides a lower inwardly directed supporting flange 24 offset upwardly of the bottom edge 25 thereof, which, when the panels 10 are arranged in a shiplap relation with juxtaposed panels, sits upon the heat-retaining baffle 18 of such juxtaposed panels to support each panel in such relationship as is seen in FIG. 4.

When a number of the panels 10 are assembled, the baffle flanges 18 and 23 which are formed from the horizontal edges 19 and 22 of the respective outer wall 11 and the center plate 13, cooperate with the heat-retaining baffles 20 and 22 provided by the opposite vertical edges 26 and 21 of the respective outer wall 11 and inner wall 12 to enclose all of the metallic sheets 17 within a single panel unit. By this construction a strong self-supporting distortion-free panel is provided.

The center separating and supporting plate 13 has an important additional function, in that it dissipates throughout its entire surface, heat that is transmitted through the connecting rivets 14, before it can reach the outer wall 11 and create hot spots surrounding the exposed head of such rivets 14.

The construction of the insulated wall panels 10 as heretofore described permits a retention of heat or temperature variance from rapidly escaping from an inner structure by reason of the fact that the randomly wrinkled metallic sheets prevent lateral transmission of the temperature variances and retain the same between the sheets while the heat retaining baffles provided by the metallic structural members retard rapid temperature dissipation between juxtaposed panels.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An insulated panel for a wall and the like comprising:
    (a) a metallic outer wall member providing along one side and its top edge laterally extending heat-retaining flanges,
    (b) an inner wall member connected to said outer wall member and providing along one side edge opposite to the said one side of said outer wall member a lateral heat-retaining flange which extends in the direction of said outer wall member,
    (c) a center separating and supporting plate parallelly disposed between said outer and inner wall members, and having side edges extending beyond the oppositely confronting heat retaining flanges of said outer and inner wall members,
    (d) sheets of vagrantly formed insulating material between said outer wall member and said center plate and between said center plate and said inner wall member with said sheets cooperating with each other to form an inner heat-entrapping cellular structure, and (e) means for connecting together as an integral panel said outer and inner wall members and said center separating and supporting plate with said means preventing compression of said sheets of insulating material therebetween.

2. An insulating panel as defined by claim 1 wherein said means for connecting together as an integral panel said outer and inner wall members and said center separating and supporting plate comprises elongated connecting members freely projected through spacer bushings disposed between said outer wall member and said center plate, and said center plate and said inner wall member with said spacer bushings maintaining the parts of said panel in a spaced relation.

3. An insulating panel as defined by claim 1 wherein said sheets of insulating material comprise aluminum foil with the sheets of foil between said outer wall member and said center plate of a length sufficient to extend between the lateral heat retaining flange on one side edge of said outer wall member and the opposite edge of said center plate, and the sheets of foil between said center plate and said inner wall member being of a sufficient length to extend between the heat retaining flange on said one side edge of said inner wall member and the opposite edge of said plate, so that when said center panel is mounted in a shiplap relation with a like panel the outer wall member and inner wall member will be separated from said center plate by said aluminum foil.

4. An insulating panel as defined by claim 3 wherein said means for connecting together as an integral panel said outer and inner wall members and said center and separated plate comprises elongated connecting members freely projected through spacer bushings disposed between said outer wall member and said center plate, and said center plate and said inner wall member with said spacer bushings maintaining the parts of said panel in a spaced relation.

References Cited

UNITED STATES PATENTS

| 2,164,790 | 7/1939 | Smith | 52—419 |
| 2,280,647 | 4/1942 | Hawes | 52—618 X |
| 2,583,912 | 1/1952 | Weiss | 52—540 X |
| 2,762,470 | 9/1956 | Parkes et al. | 52—535 X |
| 3,282,011 | 11/1966 | Meserole et al. | 52—618 X |

FOREIGN PATENTS 916,977   1/1963   Great Britain.

FRANK L. ABBOTT, *Primary Examiner.*

ALFRED C. PERHAM, *Assistant Examiner.*